United States Patent
Hossen et al.

(12) 
(10) Patent No.: US 10,681,926 B2
(45) Date of Patent: Jun. 16, 2020

(54) HIGH PROTEIN FLAKES DERIVED FROM PROTEIN PELLETS

(71) Applicant: Kellogg Company, Battle Creek, MI (US)

(72) Inventors: Monjur Hossen, Battle Creek, MI (US); George Cherian, Battle Creek, MI (US); Muhammad Asif, Battle Creek, MI (US)

(73) Assignee: KELLOGG COMPANY, Battle Creek, MI (US)

( * ) Notice: Subject to any disclaimer, the term of this patent is extended or adjusted under 35 U.S.C. 154(b) by 233 days.

(21) Appl. No.: 15/351,624

(22) Filed: Nov. 15, 2016

(65) Prior Publication Data

US 2017/0135375 A1    May 18, 2017

Related U.S. Application Data

(60) Provisional application No. 62/255,710, filed on Nov. 16, 2015.

(51) Int. Cl.
| | |
|---|---|
| A23L 7/117 | (2016.01) |
| A23L 33/17 | (2016.01) |
| A23P 30/20 | (2016.01) |
| A23L 5/10 | (2016.01) |
| A23J 3/14 | (2006.01) |
| A23J 3/26 | (2006.01) |

(52) U.S. Cl.
CPC ............. *A23L 7/117* (2016.08); *A23J 3/14* (2013.01); *A23J 3/26* (2013.01); *A23L 5/10* (2016.08); *A23L 33/17* (2016.08); *A23P 30/20* (2016.08)

(58) Field of Classification Search
None
See application file for complete search history.

(56) References Cited

U.S. PATENT DOCUMENTS

| | | | |
|---|---|---|---|
| 3,062,657 A | 11/1962 | Vollink | |
| 3,687,687 A | 8/1972 | Liepa | |
| 3,753,728 A | 8/1973 | Bedenk et al. | |
| 5,372,826 A | 12/1994 | Holtz et al. | |
| 6,303,177 B1 | 10/2001 | Ning et al. | |
| 8,367,142 B2 | 2/2013 | Karwowski et al. | |
| 8,778,442 B2 | 7/2014 | Khan et al. | |
| 2004/0043128 A1 | 3/2004 | Duffy et al. | |
| 2005/0220979 A1* | 10/2005 | Baumer | A23J 3/16 426/656 |
| 2005/0233059 A1 | 10/2005 | Harada et al. | |
| 2009/0155444 A1 | 6/2009 | Yakubu et al. | |
| 2012/0315359 A1 | 12/2012 | Gandhi et al. | |

OTHER PUBLICATIONS

Miller, R., "Breakfast and cereal extrusion technology"—The Technology of Extrusion Cooking, Ed. Frame, N.D., Springer-Science, 1994, p. 73-108. (Year: 1994).*
PCT/US2016/062001 International Search Report dated Feb. 1, 2017.

* cited by examiner

*Primary Examiner* — Elizabeth Gwartney
(74) *Attorney, Agent, or Firm* — Honigman LLP; Kathryn D. Doyle, Esq.; Jonathan P. O'Brien

(57) ABSTRACT

The present invention relates to methods for preparing high protein flakes comprising forming a protein into a protein pellet and introducing the protein pellet and a food component into a cooker. The protein pellet and the food component are cooked in the cooker to give a cooked food product. The food product is then formed into a high protein flake.

18 Claims, 1 Drawing Sheet

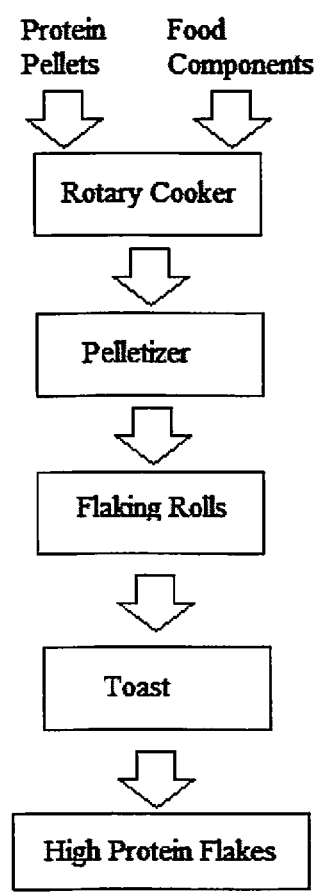

ably is intended to be used in construing the scope of the claims or to limit the scope of the subject matter that is disclosed herein. Classification or discussion of a material within a section of this specification as having a particular utility is made for convenience, and no

HIGH PROTEIN FLAKES DERIVED FROM PROTEIN PELLETS

CROSS-REFERENCED TO RELATED APPLICATIONS

This application claims priority under 35 U.S.C. § 119(e) to U.S. Provisional Application 62/255,710, filed on Nov. 16, 2015, the entire contents of which are incorporated herein by reference.

TECHNICAL FIELD

This disclosure relates to high protein flakes obtained from methods that use protein pellets and a food component in the cooker.

BACKGROUND

The statements in this section merely provide background information related to the present disclosure and may not constitute prior art.

Flaked cereal products are a staple food item in many countries. The flakes are generally made of wheat, corn, oats, and the like, which provide nutritious foodstuffs to consumers. In recent years, manufacturers have become interested in providing flaked food materials that extend beyond the traditional carbohydrate-based flakes, so that other nutritious food constituents can be provided. In particular, many manufacturers would like to provide flaked food material products that include a larger amount of protein.

However, providing high protein flakes has been problematic. Both taste and mouthfeel parameters, which are necessary to provide a desirable product, have not been met when the amount of protein is increased. Additionally, high protein flakes prepared using conventional cooking techniques commonly provide flakes that are fragile and that contain multiple points of weakness, ultimately leading to unwanted cereal flake breakage.

Accordingly, it is an object of the present invention to provide a method for obtaining high protein flakes that have desirable sensorial and texture properties and that are not subject to undesirable breakage.

SUMMARY OF THE INVENTION

The present invention relates to a method for preparing high protein flakes from protein pellets. The invention also relates to high protein flakes having a high protein content with uniform distribution of protein within each flake and among the flakes.

In one aspect, the present invention provides a method for preparing high protein flakes comprising forming a protein into a protein pellet and introducing the protein pellet and a food component into a cooker. The protein pellet and the food component are cooked in the cooker to give a cooked food product. The cooked food product is then formed into a high protein flake.

In another aspect, the present invention provides a method for preparing high protein flakes comprising introducing a protein pellet and a grain into a rotary cooker. The protein pellet and the grain are cooked in the rotary cooker to obtain a food product. The food product is pelletized, and then the pelletized food product is thermally processed to obtain a high protein flake. The high protein flake has a moisture content of about 1% to about 5% by weight, a characteristic hardness of about 8000 grams of force to about 13000 grams of force when measured using a Texture Testing Protocol, and a characteristic crunchiness of about 8000 grams per second to about 12000 grams per second when measured using the Texture Testing Protocol.

In yet another aspect, the present invention provides a method for producing high protein flakes comprising preparing at least one protein pellet and heating the protein pellet and at least one food component in a rotary cooker to form a cooked food product. A high protein flake is then formed from the cooked food product. The high protein flake exhibits less cereal flake breakage than a comparable high protein flake prepared without the protein pellet.

In an additional aspect, the present invention provides a method for preparing high protein flakes comprising combining a quantity of protein pellets and food ingredients in a rotary cooker to form an uncooked food product and thermally processing the uncooked food product to produce a cooked food product. The cooked food product is processed to obtain a high protein flake. The quantity of the protein pellets is sufficient to provide a total protein content in the high protein flake of about 1% to about 50% by weight of the high protein flake.

In a further aspect, the present invention provides a method for preparing a plurality of high protein flakes comprising introducing at least one protein pellet and a grain into a rotary cooker and cooking the protein pellet and the grain in the rotary cooker to obtain a cooked food product. The cooked food product is pelletized and then thermally processed to obtain the plurality of high protein flakes.

DESCRIPTION OF THE DRAWINGS

Numerous other objects, features, and advantages of the present invention will be apparent based upon the following description of the drawings.

FIG. 1 is a flow chart showing methodology for aspects of the present invention.

DETAILED DESCRIPTION

The following description is merely exemplary in nature and is not intended to limit the present disclosure, application, or uses. The aspects and embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention. The following definitions and non-limiting guidelines must be considered in reviewing the description of the technology set forth herein.

The headings (such as "Introduction" and "Summary") and sub-headings used herein are intended only for general organization of topics within the present technology, and are not intended to limit the scope of the disclosure of the present technology or any aspect thereof. In particular, subject matter disclosed in the "Introduction" may include novel technology and may not constitute a recitation of prior art. Subject matter disclosed in the "Summary" is not an exhaustive or complete disclosure of the entire scope of the technology or any embodiments thereof. Any recitation in the "Abstract" of this application is not intended to be used to construe the scope of the claims or to limit the scope of the subject matter that is disclosed herein. Classification or discussion of a material within a section of this specification as having a particular utility is made for convenience, and no inference should be drawn that the material must necessarily or solely function in accordance with its classification herein when it is used in any given composition.

The citation of references herein does not constitute an admission that those references are prior art or have any relevance to the patentability of the technology disclosed herein. Any discussion of the content of references cited in the Introduction is intended merely to provide a general summary of assertions made by the authors of the references, and does not constitute an admission as to the accuracy of the content of such references. All references cited in the "Description" section of this specification are hereby incorporated by reference in their entirety.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made, or tested. Any use of the past tense to describe an example that may otherwise be indicated as constructive or prophetic is not intended to reflect that the constructive or prophetic example has actually been carried out.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Applicants reserve the right to proviso out any selection, group, element, or aspect, for example, to limit the scope of any claim to account for a prior disclosure of which Applicants may be unaware.

As used herein, "sensory analysis" are methods that can be used to evaluate the properties of the high protein flakes. The properties of high protein flakes may also be compared to the properties of comparable high protein flakes that are not obtained from the inventive methods described herein. Any appropriate method of sensory analysis that is common to the art can be used. Non-limiting examples of properties that may be analyzed include crunchiness, fracturability, texture, bowl life, mouthfeel, water activity, color, taste, sweetness, moistness, stickiness, and chewiness. Physical properties of the high protein flakes, including flexure, compression, and force-deformation, may be obtained, for instance, using an Instron test system or a TA.XT2i Texture Analyzer. The high protein flakes may also be evaluated using simulated flake breakage testing.

As used herein a "Texture Testing Protocol" means using the testing method and equipment as described. The hardness and crunchiness of the high protein flakes may be measured using a 6 millimeter diameter Magness Taylor probe mounted on a texture analyzer such as a TA.XT2 Texture Analyzer manufactured by Stable Micro Systems, Ltd. in Godalming, Surrey, U.K. and distributed in North America by Texture Technologies Corp. in Scarsdale, N.Y. In order to determine the texture of the flake, it undergoes a Texture Testing Protocol. For purposes of this application, the Texture Testing Protocol for the present invention is as follows: (1) mount the flake on a solid base support with a diameter of about 20 millimeters and a hole centered under the probe; (2) puncture a hole in the flake using a Magness Taylor probe having a 6 millimeter diameter traveling at a speed between about 1 millimeter per second and about 20 millimeters per second through a distance of about 3 millimeters; (3) measure and plot the force required for the probe to break through the flake in gram force versus time. The maximum force (in grams) of the resulting puncture curve is the characteristic hardness of the flake. The slope of the puncture curve reflects how fast the flake crumbles and disintegrates, which is the characteristic crunchiness of the flake. The crunchiness is expressed in force per time or, with respect to the present invention, grams per second.

As used herein a "cooked food product" is a food product that has been subjected to thermal processing, or cooking. Any uncooked food product or edible foodstuff may be subjected to cooking, or thermal processing, to obtain a cooked food product. Cooked food products are generally produced by the food industry in such way that they are suitable for consumption without or with minimal further processing. The further processing steps are, for instance, adding a liquid, such as water or milk and/or heating the product. Such processed foods are typically marketed in a dedicated packaging, which either comprises a single or multiple serving sizes of the food product. Furthermore, the packaging of processed foods carries a food label providing information on the ingredients of the product and its nutritional composition as well as on the recommended serving size of the product. Examples of processed foods include baked goods, dairy products, pasta products, ready to eat cereals, fruit preparations, fruit juices, nectars, smoothies, processed meat products, and confectionary, including chocolate products.

As used herein an "uncooked food product," an "edible foodstuff," and a "food component" means a food product and may include an additive, component, supplement, or ingredient useful in preparing or supplementing a food, or a food intermediate, or a fully prepared composition but in a raw state (requiring a further treatment step prior to consumption, such as baking dough to produce bread). Food products as provided hereunder generally include any type of food product, food ingredient, food intermediate, or mixtures thereof. The food products can be in any suitable form, including raw or pre-treated. Suitable methods of pre-treating the food products include, but are not limited to, blanching, steaming, boiling, chopping, macerating, comminuting, reducing the particle size, drying with heat, and combinations thereof.

The term "moisture content" as used herein refers to the amount of moisture in a material. The moisture content of a material can be determined by A.O.C.S. (American Oil Chemists Society) Method Ba 2a-38 (1997), which is incorporated herein by reference in its entirety. Moisture content is calculated according to the formula: Moisture content (%)=100×[loss in mass (grams)/mass of sample (grams)].

As used herein "thermal processing" or "thermally processed" means heating by any method. Thermal processing is synonymous with cooking, baking, frying, boiling, grilling, toasting, and the like.

According to an aspect of the invention, there is provided a method for preparing high protein flakes comprising forming a protein into a protein pellet and introducing the protein pellet and a food component into a cooker. The protein pellet and the food component are cooked in the cooker to give a cooked food product. The food product is then formed into a high protein flake.

As shown in FIG. 1, in one embodiment the method includes cooking the food component and protein pellets in a rotary cooker, such as a commercial rotary steam pressure cooker. The cooked mixture is then removed from the rotary cooker and cooled. The cooked mixture is then formed into pellets using a conventional cereal pelletizer. Next, the pellets are dried are then added to a flaking mill, such as a conventional flaking mill used to form conventional ready-to-eat cereal flakes. The flaking mill is used to press the pellets into the high protein flakes. The flaking mill typically includes rollers. Finally, the high protein flakes are dried and toasted. The finished high protein flakes have a structural integrity, texture, size, shape, and overall appearance similar to conventional ready-to-eat cereal flakes. In one embodiment, the method further includes applying a coating to the high protein flakes. Coating processes used for conventional ready-to-eat cereals can be used.

In one embodiment the method includes cooking the food component and protein pellets in a cooker, such as a commercial rotary steam pressure cooker. The food component and protein pellets are cooked for about 20 minutes to about 60 minutes at a steam pressure of about 2 psig to about 30 psig. The cooking temperature will depend on the steam pressure and is determined by steam tables, but is typically about 250° F. to about 280° F. Next, in an optional step, flavor additives, processing aids, and water may be added to the rotary cooker and cooked along with the food component and protein pellets. The mixture is cooked at a steam pressure of about 2 psig to about 30 psig and to a moisture content of about 30 wt % to about 50 wt % based on the total weight of the cooked mixture. The cooked mixture is then cooled, and optionally dried in a conventional fluidized bed type dryer operating at about ambient temperature to a moisture content of about 20 wt % to about 40 wt % based on the total weight of the cooked mixture.

The cooked mixture is then formed into pellets using a conventional cereal pelletizer. The dry, cooked mixture is added to pellet former and formed into pellets. Pellet forming processes used to form conventional ready-to-eat cereals can be used to form the pellets. The pellets have a moisture content of about 20 wt % to about 40 wt % based on the total weight of the pellets.

Next, the pellets are dried to a moisture content of about 15 wt % to about 30 wt %. Typically, the pellets are dried in the conventional fluidized bed type dryer maintaining a temperature less than the boiling point of water, for example the conventional fluidized bed type dryer operating at a temperature of about 170° F. to about 210° F. for about 4 minutes to about 15 minutes. The dried pellets are then added to a flaking mill, such as a conventional flaking mill used to form conventional ready-to-eat cereal flakes. The pellets are preferably at a temperature of about 110° F. to about 170° F. when added to the flaking mill. The flaking mill is used to press the pellets at a temperature of about 110° F. to about 150° F. into the high protein flakes. The flaking mill typically includes rollers operating at a speed of about 450 rpm to about 650 rpm.

Finally, the high protein flakes are dried and toasted in a conventional hot air impingement type oven to a moisture content of about 1 wt % to about 5 wt %. The finished high protein flakes have a structural integrity, texture, size, shape, and overall appearance similar to conventional ready-to-eat cereal flakes. In one embodiment, the method includes applying a coating to the high protein flakes. Coating processes used for conventional ready-to-eat cereals can be used.

In some embodiments, the protein is a plant or vegetable protein. In some embodiments, the vegetable protein is derived from a cereal grain selected from the group consisting of wheat, corn, barley, oats, legumes, sorghum, buckwheat, soybeans, fava, and peas. Plant protein sources can also include soy protein, soy flour, defatted soy meal, soy protein isolate, wheat gluten, canola protein, corn zein, and mixtures thereof. Corn zein and wheat gluten are the protein isolates derived from corn and wheat respectively. In some embodiments, the protein is substantially free of one or more of wheat gluten, soy protein, or corn zein.

In some embodiments, a method for forming the protein into protein pellets is provided. The method may comprise providing the protein and introducing the protein into an extruder to form a protein extrudate. The protein extrudate may then be forced to exit the extruder and then transferred to a cold form extruder. The protein extrudate may then be forced to exit the cold form extruder. Finally, the protein extrudate may be cut to form the protein pellet. In some embodiments, the protein pellet may then be dried.

Any suitable commercial method for forming pellets may be used. In certain aspects of the preset invention, ingredients including the protein (or protein flour) are combined and subjected to mixing. The resulting mixture is then subjected to pre-conditioning in a preconditioner. The preconditioner hydrates, mixes, and partially thermally cooks the protein to form a dough. In the preconditioning step, the protein and water remain in the preconditioner for a residence time of about 1-2 minutes under low shear conditions.

Following preconditioning, the hydrated protein mixture is subjected to extruding by immediately introducing the mixture into a twin screw extruder and processing. Additional moisture may be added to the mixture to obtain a moisture level of about 30-60 wt %. The barrels of the extruder may be heated incrementally, for example from about 150° F. to about 250° F., in the direction of flow to raise the dough temperature. The pressure of the extruder may be increased, for example to about 200 psig to about 800 psig. The mixture is maintained in the extruder for about 1-6 minutes at the parameters identified herein.

After the dough exits the twin extruder, it is subjected to forming and cutting. In particular, it is immediately transferred, via positive displacement through a transfer pipe, to the cold forming, single screw extruder. The dough is compressed, cooled through a water jacketed barrel liner, and conveyed through the extruder to a die assembly at the end of the screw, typically a breaker plate and die. The dough is then cut into pellet form. Lastly, the extruded protein pellets are subjected to drying using any suitable apparatus such as a short or pre-dryer and finishing dryer. Dryers may be of a vibratory, rotary, fluidized bed, or conveyor style. After drying, the protein pellets are cooled to room temperature on a slow moving conveyor belt or on an air cooling conveyor.

In some embodiments, the protein pellets comprise at least one source of protein and have an overall protein content of at least about 30%, 40%, 50%, 60%, 70%, 80%, 90%, 95%, or more protein by weight of the protein pellet. In other embodiments, the protein pellets have an overall protein content of about 30-95%, about 40-95%, about 60-90%, about 75-90%, about 80-90%, about 90-99%, about 95-99%, or about 95-97% by weight of the protein pellet.

The protein pellets of the present invention are typically of a cylindrical shape. Cylindrically shaped protein pellets typically have an average diameter of about 1 to 20 mm, about 3 to 20 mm, about 2 to 18 mm, about 1 to about 10 mm, about 2 to about 10 mm, about 3 to about 10 mm, or about 5 to about 10 mm. Cylindrically shaped pellets further typically have an average length of about 0.5 to 6 mm or about 1 to 6 mm.

The moisture content of the protein pellet of the present invention is about 20 wt % or less. The moisture content can be from about 6 to 20 wt %, from about 6 to 18 wt %, from about 8 to 16 wt %, or from about 10 to 15 wt %. In still other embodiments, the moisture content of the protein pellet is less than about 20%, 18%, 15%, 12%, 10%, 8%, 7%, or 5% by weight of the protein pellet. Moisture content may be measured by grinding the protein pellet to a particle size smaller than about 500 μm, drying at about 103° C. in an oven for about 4 hours, and calculating the moisture content from the weight loss.

In some embodiments, the protein pellets of the present invention have a density of from about 0.02 g/cm$^3$ to about 1 g/cm$^3$. In certain embodiments, the protein pellets of the present invention have a density of from about 0.1 to about 0.4 g/cm$^3$ or from about 0.15 g/cm$^3$ to about 0.35 g/cm$^3$. In such embodiments, the density of the protein pellets may be from about 0.20 g/cm$^3$ to about 0.27 g/cm$^3$, from about 0.24 g/cm$^3$ to about 0.27 g/cm$^3$, or from about 0.27 g/cm$^3$ to about 0.32 g/cm$^3$. In still other embodiments, the density of the protein pellets may be at least about 0.1 g/cm$^3$, at least about 0.2 g/cm$^3$, at least about 0.25 g/cm$^3$, at least about 0.3 g/cm$^3$, at least about 0.4 g/cm$^3$, or at least about 0.5 g/cm$^3$.

The protein pellets of the present invention may further be characterized as having a hardness of at least about 1000 grams. Typically, the protein pellets have a hardness of from about 1000 grams to about 50,000 grams and, more typically, from about 5,000 grams to about 40,000 grams. In various embodiments, the hardness is from about 7,000 grams to about 30,000 grams. The hardness of the protein pellets is generally determined by placing a pellet sample in a container and crushing the sample with a probe. The force required to break the sample is recorded; the force that is required to crush the sample based on its size or weight is proportional to the hardness of the product. The hardness of the protein pellets may be determined using a TA.TXT2 Texture Analyzer having a 25 kg load cell, manufactured by Stable Micro Systems Ltd. (England).

The cooking of the protein pellet and food component according to this invention can be done in any standard cooking equipment, such as a rotary cooker, immersion cooker, or pressure cooker. In some embodiments, the cooker is a rotary cooker. In accordance with one aspect of the present invention, the protein pellet and food component are first introduced into a rotary cooker. The protein pellet and food component are subsequently cooked using steam and water in the rotary cooker for a cycle time of about 30-90 minutes, which includes reaching a cooking temperature and pressure of about 250°-280° F. and about 15-25 psig, respectively. The rotary cooker is typically operated at about 1-5 rpm. The protein pellet and food component are cooked at the target temperature and pressure for about 15-60 minutes. In one aspect of the invention, the protein pellet and food component are cooked in the rotary cooker to about 30-50% moisture. Any food-grade rotary cooker may be used in accordance with the present invention, such as the Lauhoff Model LC 91 Serial 9307. As one of ordinary skill in the art of the food sciences would appreciate, the cooking conditions vary by protein and food component. At the completion of cooking, a cooked food product is obtained.

In some embodiments, the step of cooking is conducted at a temperature of about 150° F., 175° F., 200° F., 225° F., 250° F., about 275° F., about 300° F., about 325° F., or about 350° F. In certain embodiments, the step of cooking is conducted at a temperature of about 150° F. to about 400° F., about 200° F. to about 250° F., about 225° F. to about 275° F., about 250° F. to about 300° F., about 275° F. to about 325° F., about 300° F. to about 350° F., about 300° F. to about 400° F., or about 350° F. to about 400° F. In still other embodiments, the step of cooking is conducted at a pressure of about 5 psig, about 10 psig, about 15 psig, about 20 psig, about 25 psig, or about 30 psig. In some embodiments, the step of cooking is conducted at a pressure of about 15 psig to about 30 psig, about 15 psig to about 25 psig, about 15 psig to about 20 psig, or about 10 psig to about 15 psig.

In some embodiments, the step of forming the cooked food product into a high protein flake comprises pelletizing the cooked food product to provide a cooked food pellet. The cooked food pellet may then be flaked to provide a flaked food product. The flaked food product may then be toasted to obtain the high protein flake.

In certain aspects, the cooked food product may be transferred by means of belt conveyers to a pelletizer for forming the cooked food product into pellets for flaking. Upon entering the pelletizer, the cooked food product may be in the form of agglomerates. The agglomerates fed to the pelletizer may range in size from about golf-ball sized to granular sized, and may preferably be less than about 0.5 cm in diameter. They may be processed at a temperature of less than about 140° F., or from about 75° F. to about 100° F., or from about 80° F. to about 90° F.

Commercially available extruders or pelletizers, such as a Bonnet or a Wenger pelletizer may be employed to produce a pelletized cooked food product from the agglomerates of cooked food product in the present invention. The pelletizer may be equipped with a solid or cut-flight screw conveyer for conveying and shearing of the tempered cooked food product from the input end to the output end and through the exit die plate. Cooling jackets are preferably provided to control the temperature of the agglomerates in the pelletizer and to control the temperature of the pellets exiting the pelletizer. The cooling jackets help to remove heat generated by the shearing action occurring in the pelletizer and at the die plate as the agglomerates are forced through the die plate apertures.

The pelletizer may be equipped with an internal knife installed on the upstream side of an exit die plate, and an external knife installed on the downstream side of the exit die plate for forming the cooked food product agglomerates into a rope or rod that is cut into the cooked food product pellets. In embodiments of the invention, the die plate may have a plurality of holes or apertures each having a diameter of about 3/16 inch to about 5/16 inch. The open area of the die plate, or the total area of the apertures as a percentage of the die plate area, may range from about 14% to about 55%, from about 25% to about 45%, or from about 38% to about 42%.

In some embodiments, the step of thermally processing comprises flaking the pelletized food product to give a flaked food product. The flaked food product is then toasted to obtain the high protein flake. The cooked food product pellets may be produced with dimensions for flaking. For example, the pellets may have a cut length of about ⅛ inch to about ¼ inch, and a diameter of about 3/16 inch to about 5/16 inch imparted by the die apertures.

In accordance with the method of the present invention, the pelletizing pressure, as measured at the die plate, may be from about 400 psig to about 1800 psig or from about 400 psig to about 500 psig. The pressures and temperatures employed preferably result in no or substantially no expansion of the extrudate exiting the die orifices. In addition, the temperature of the cooked food product pellets exiting the pelletizer should be sufficiently low so that any increase in temperature caused by the flaking operation does not result in deleterious sticking of the flakes to the downstream flaking rolls. Upon exiting the pelletizer, the cooked food product pellets should not be permitted to sit too long so as to impede flaking.

The cooked food product pellets may preferably be immediately or quickly, for example within about 20 minutes or about 10 minutes, transported to a flaking operation so as to avoid any substantial hardening of or skin formation on the soft, pliable pellets. In embodiments of the invention, the cooked food product pellets may be transferred by means of pneumatic conveyors or belt conveyors and/or bucket elevators to a hopper that feeds a screw conveyor. The latter may transfer the whole grain pellets to a series of flaking rolls via flow tubes, hoppers, or pneumatic conveyors. An example of such a screw conveyor is that made by the Screw Conveyor Corporation, 704 Hoffman Street, Hammond, Ind. 46327. The moisture content of the cooked food product pellets for flaking may range from about 10% by weight to about 42% by weight or from about 15% by weight to about 30% by weight, based upon the weight of the pellets.

The high protein flakes of the present invention include protein in an amount of about 1% to about 50%, about 2% to about 25%, about 5% to about 25%, about 10% to about 20%, about 2% to about 50%, about 5% to about 50%, about 10% to about 50%, about 20% to about 50%, about 30% to about 50%, about 40% to about 50%, or about 25% by weight of the high protein flake. In some embodiments, the amount of protein in the high protein flakes is about 2%, 4%, 6%, 8%, 10%, 12%, 14%, 16%, 18%, 20%, 22%, 24%, 25%, 30%, 32%, 34%, 36%, 38%, 40%, 42%, 44%, 46%, 48%, or 50% by weight of the high protein flake.

The high protein flakes of the present invention has a moisture content of about 1% to about 15%, about 1% to about 15%, about 1% to about 10%, about 2% to about 8%, about 4% to about 6%, about 5% to about 15%, about 10% to about 15%, about 5% to about 10%, about 1% to about 5%, or about 1% to about 3% by weight of the high protein flake. In some embodiments, the moisture content of the high protein flakes is about 2%, 3%, 4%, 5%, 6%, 7%, 8%, 9%, 10%, 11%, 12%, 13%, 14%, or 15% by weight of the high protein flake.

The high protein flakes of the present invention include at least one grain with the total amount of grain present in an amount of about 18 to 66 wt %, about 30 to about 70 wt %, about 35 to 66 wt %, about 42 to 63 wt %, or about 45 to 57 wt % based on the total weight of the high protein flakes. The grains are preferably a blend of whole grains, rice, brown rice, and wheat, but can include oats, barley, corn, millet, buckwheat, sorghum, triticale, or any combination thereof. The grains can be provided in a variety of forms, such as whole, flour, powder, meal, grits, flakes, bran, and germ.

In still another aspect of the present invention, there is provided a method for preparing high protein flakes comprising introducing a protein pellet and a grain into a rotary cooker. The protein pellet and the grain are cooked in the rotary cooker to obtain a food product. The food product is pelletized, and then the pelletized food product is thermally processed to obtain a high protein flake. The high protein flake has a moisture content of about 1% to about 5% by weight, a characteristic hardness of about 8000 grams of force to about 13000 grams of force when measured using a Texture Testing Protocol, and a characteristic crunchiness of about 8000 grams per second to about 12000 grams per second when measured using the Texture Testing Protocol.

In some embodiments, the high protein flake has a characteristic hardness of about 8000 grams of force to about 13000 grams of force, about 10000 grams of force to about 13000 grams of force, about 10000 grams of force to about 12000 grams of force, or about 10000 grams of force to about 11000 grams of force when measured using a Texture Testing Protocol. In other embodiments, the high protein flake has a characteristic hardness of about 8000, 9000, 10000, 11000, 12000, or 13000 grams of force when measured using a Texture Testing Protocol.

In some embodiments, the high protein flake has a characteristic crunchiness of about 8000 grams per second to about 12000 grams per second, about 8000 grams per second to about 11000 grams per second, about 8000 grams per second to about 10000 grams per second, or about 9000 grams per second to about 10000 grams per second when measured using the Texture Testing Protocol. In other embodiments, the high protein flake has a characteristic crunchiness of about 8000, 9000, 10000, 11000, or 12000 grams per second when measured using the Texture Testing Protocol.

In a further aspect of the present invention, there is provided a method for producing high protein flakes comprising preparing a protein pellet from a protein flour and heating the protein pellet and at least one food component in a rotary cooker to form a cooked food product. A high protein flake is then formed from the cooked food product. The high protein flake exhibits less cereal flake breakage than a comparable high protein flake prepared without the protein pellet. In some embodiments, the high protein flake and the comparable high protein flake both comprise substantially the same amount and the same type of protein.

In another aspect of the present invention, there is provided a method for preparing high protein flakes comprising combining a quantity of protein pellets and food ingredients in a rotary cooker to form an uncooked food product and thermally processing the uncooked food product to produce a cooked food product. The cooked food product is processed to obtain a high protein flake. The quantity of the protein pellets is sufficient to provide a total protein content in the high protein flake of about 5% to about 50% by weight of the high protein flake.

In some embodiments, the quantity of protein pellets in the uncooked food product is an amount of about 10% to about 70%, about 15% to about 70%, about 20% to about 70%, about 25% to about 70%, about 30% to about 70%, about 40% to about 70%, about 50% to about 70%, or about 60% to about 70% by weight of the uncooked food product. In still other embodiments, the quantity of protein pellets in the uncooked food product is an amount of about 70%, 65%, 60%, 55%, 50%, 45%, 40%, 35%, 30%, 25%, 20%, 15%, 10%, or 5% by weight of the uncooked food product.

In some embodiments, the quantity of protein pellets is sufficient to provide a total protein content of about 1% to about 50%, about 2% to about 25%, about 5% to about 25%, about 10% to about 20%, about 2% to about 50%, about 5% to about 50%, about 10% to about 50%, about 15% to about 50%, about 20% to about 50%, about 25% to about 50%, about 30% to about 50%, about 35% to about 50%, about 40% to about 50%, about 45% to about 50%, about 5% to about 45%, about 5% to about 40%, about 5% to about 35%, or about 5% to about 20% by weight of the high protein flake. In still other embodiments, the quantity of protein pellets is sufficient to provide a total protein content of about 50%, 45%, 40%, 35%, 30%, 25%, 20%, 15%, 10%, or 5% by weight of the high protein flake.

In yet another aspect of the present invention there is provided a method for preparing a plurality of high protein flakes comprising introducing a protein pellet and a grain into a rotary cooker and cooking the protein pellet and the grain in the rotary cooker to obtain a cooked food product. The cooked food product is pelletized and then thermally processed to obtain the plurality of high protein flakes.

In some embodiments, each high protein flake in the plurality of high protein flakes has a substantially uniform distribution of protein within the high protein flake. As used herein, a substantially uniform distribution of protein within a flake means that the protein density throughout the flake is constant. In contrast, comparable high protein flakes that are not prepared by the methods of this invention have a non-uniform distribution of protein within the flake or a non-uniform protein density in the flake. Without being bound by theory, using a protein pellet instead of a protein flour in the cooker results in a uniform distribution of protein within the resulting flake material.

In some embodiments, substantially all of the protein flakes within the plurality of high protein flakes has substantially the same amount of protein. In other embodiments, the first high protein flake and the second high protein flake in the plurality of high protein flakes have substantially equal, or the same, amounts of protein. In contrast, comparable high protein flakes that are not prepared by the methods of this invention have a non-uniform distribution of protein between the flakes.

In some embodiments, the plurality of high protein flakes provides a protein content of at least about 5 grams in a 30 gram serving of the plurality of high protein flakes. In still other embodiments, the plurality of high protein flakes provides a protein content of at least about 6, 7, 8, 9, or 10 grams in a 30 gram serving of the plurality of high protein flakes.

In some embodiments, the step of thermally processing is selected from the group consisting of baking, frying, roasting, boiling, toasting, extruding, and grilling. In specific embodiments, the step of thermally processing involves one or more methods of thermal processing. In some embodiments, the method of thermal processing is baking. In other embodiments, the method of thermal processing is toasting.

In some embodiments, the food component comprises at least one of a grain, a sugar, or a starch. In other embodiments, the high protein flakes may comprise at least one of a grain, sugar, or starch. In still other embodiments, the food component comprises a grain, a sugar, and a starch. In yet other embodiments, the high protein flakes comprise a grain, a sugar, and a starch.

Grain sources used for the current invention include, but are not limited to, wheat, buckwheat, corn, barley, oats, legumes, sorghum, soybeans, fava, and peas.

In one embodiment, the high protein flakes of the present invention include protein in amount of about 40% to about 50% by weight of the high protein flake, having a moisture content of about 5% to about 15% by weight of the high protein flake, and including at least one grain with the total amount of grain in an amount of about 42% to about 63% by weight of the high protein flake.

In another embodiment, the high protein flakes of the present invention include protein in amount of about 30% to about 40% by weight of the high protein flake, having a moisture content of about 5% to about 15% by weight of the high protein flake, and including at least one grain with the total amount of grain in an amount of about 42% to about 63% by weight of the high protein flake.

In still another embodiment, the high protein flakes of the present invention include protein in amount of about 20% to about 30% by weight of the high protein flake, having a moisture content of about 5% to about 15% by weight of the high protein flake, and including at least one grain with the total amount of grain in an amount of about 42% to about 63% by weight of the high protein flake.

In one embodiment, the high protein flakes of the present invention include protein in amount of about 40% to about 50% by weight of the high protein flake, having a moisture content of less than about 5% by weight of the high protein flake, and including at least one grain with the total amount of grain in an amount of about 42% to about 63% by weight of the high protein flake.

In another embodiment, the high protein flakes of the present invention include protein in amount of about 40% to about 50% by weight of the high protein flake, having a moisture content of about 5% to about 10% by weight of the high protein flake, and including at least one grain with the total amount of grain in an amount of about 42% to about 63% by weight of the high protein flake.

In one embodiment, the high protein flakes of the present invention include protein in amount of about 40% to about 50% by weight of the high protein flake, having a moisture content of about 5% to about 15% by weight of the high protein flake, and including at least one grain with the total amount of grain in an amount of about 35% to about 66% by weight of the high protein flake.

In another embodiment, the high protein flakes of the present invention include protein in amount of about 40% to about 50% by weight of the high protein flake, having a moisture content of about 5% to about 15% by weight of the high protein flake, and including at least one grain with the total amount of grain in an amount of about 45% to about 57% by weight of the high protein flake.

In one embodiment, the protein pellets of the present invention include protein in an amount of about 30% to about 90% by weight of the protein pellet, having a moisture content of about 5% to about 20% by weight of the protein pellet, and having a density of about 0.1 $gm/cm^3$ to about 1 $gm/cm^3$.

In another embodiment, the protein pellets of the present invention include protein in an amount of about 30% to about 50% by weight of the protein pellet, having a moisture content of about 5% to about 20% by weight of the protein pellet, and having a density of about 0.1 $gm/cm^3$ to about 1 $gm/cm^3$.

In still another embodiment, the protein pellets of the present invention include protein in an amount of about 10% to about 50% by weight of the protein pellet, having a moisture content of about 5% to about 20% by weight of the protein pellet, and having a density of about 0.1 gm/cm$^3$ to about 1 gm/cm$^3$.

In one embodiment, the protein pellets of the present invention include protein in an amount of about 30% to about 90% by weight of the protein pellet, having a moisture content of about 5% to about 10% by weight of the protein pellet, and having a density of about 0.1 gm/cm$^3$ to about 1 gm/cm$^3$.

In another embodiment, the protein pellets of the present invention include protein in an amount of about 30% to about 90% by weight of the protein pellet, having a moisture content of about 10% to about 15% by weight of the protein pellet, and having a density of about 0.1 gm/cm$^3$ to about 1 gm/cm$^3$.

In one embodiment, the protein pellets of the present invention include protein in an amount of about 30% to about 90% by weight of the protein pellet, having a moisture content of about 5% to about 20% by weight of the protein pellet, and having a density of about 0.3 gm/cm$^3$ to about 0.7 gm/cm$^3$.

In another embodiment, the protein pellets of the present invention include protein in an amount of about 30% to about 90% by weight of the protein pellet, having a moisture content of about 5% to about 20% by weight of the protein pellet, and having a density of about 0.3 gm/cm$^3$ to about 0.5 gm/cm$^3$.

In one embodiment, the method for preparing high protein flakes of the present invention includes cooking the protein pellet and the food component in a rotary cooker to give a cooked food product and forming the cooked food product into high protein flakes, wherein the high protein flakes have a moisture content of about 5% to about 15% by weight of the high protein flake and have a protein content of about 40% to about 50% by weight of the high protein flake.

In another embodiment, the method for preparing high protein flakes of the present invention includes cooking the protein pellet and the food component in a rotary cooker to give a cooked food product and forming the cooked food product into high protein flakes, wherein the high protein flakes have a moisture content of about 5% to about 10% by weight of the high protein flake and have a protein content of about 40% to about 50% by weight of the high protein flake.

In still another embodiment, the method for preparing high protein flakes of the present invention includes cooking the protein pellet and the food component in a rotary cooker to give a cooked food product and forming the cooked food product into high protein flakes, wherein the high protein flakes have a moisture content of about 5% to about 15% by weight of the high protein flake and have a protein content of about 30% to about 40% by weight of the high protein flake.

In yet another embodiment, the method for preparing high protein flakes of the present invention includes cooking the protein pellet and the food component in a rotary cooker to give a cooked food product and forming the cooked food product into high protein flakes, wherein the high protein flakes have a moisture content of about 5% to about 15% by weight of the high protein flake and have a protein content of about 20% to about 30% by weight of the high protein flake.

In one embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes have a moisture content of about 5% to about 15% by weight of the high protein flake and have a protein content of about 40% to about 50% by weight of the high protein flake.

In another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 60% by weight of the protein pellet, having a moisture content of about 5% to about 20% by weight of the protein pellet, and wherein the high protein flakes have a moisture content of about 5% to about 15% by weight of the high protein flake and have a protein content of about 40% to about 50% by weight of the high protein flake.

In still another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 10% to about 50% by weight of the protein pellet, having a moisture content of about 5% to about 20% by weight of the protein pellet, and wherein the high protein flakes have a moisture content of about 5% to about 15% by weight of the high protein flake and have a protein content of about 40% to about 50% by weight of the high protein flake.

In yet another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 50% by weight of the protein pellet, having a moisture content of about 5% to about 20% by weight of the protein pellet, and wherein the high protein flakes have a moisture content of about 5% to about 15% by weight of the high protein flake and have a protein content of about 40% to about 50% by weight of the high protein flake.

In one embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 15% by weight of the protein pellet, and wherein the high protein flakes have a moisture content of about 5% to about 15% by weight of the high protein flake and have a protein content of about 40% to about 50% by weight of the high protein flake.

In another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 10% by weight of the protein pellet, and wherein the high protein flakes have a moisture content of about 5% to about 15% by weight of the high protein flake and have a protein content of about 40% to about 50% by weight of the high protein flake.

In still another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes have a moisture content of about 5% to about 10% by weight of the high protein flake and have a protein content of about 40% to about 50% by weight of the high protein flake.

In one embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes have a moisture content of about 5% to about 15% by weight of the high protein flake and have a protein content of about 30% to about 40% by weight of the high protein flake.

In another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes have a moisture content of about 5% to about 15% by weight of the high protein flake and have a protein content of about 30% to about 50% by weight of the high protein flake.

In one embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes provide a protein content of at least about 5 grams in a 30 gram serving of the high protein flakes.

In another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes provide a protein content of about 3 grams to about 7 grams in a 30 gram serving of the high protein flakes.

In still another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes provide a protein content of about 4 grams to about 6 grams in a 30 gram serving of the high protein flakes.

In yet another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes provide a protein content of about 4 grams in a 30 gram serving of the high protein flakes.

In another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes provide a protein content of about 5 grams in a 30 gram serving of the high protein flakes.

In yet another embodiment, the method for preparing high protein flakes of the present invention includes cooking the protein pellet and the food component in a rotary cooker to give a cooked food product and forming the cooked food product into high protein flakes, wherein the protein pellets include protein in an amount of about 30% to about 90% by weight of the protein pellet, having a moisture content of about 5% to about 20% by weight of the protein pellet, and wherein the high protein flakes provide a protein content of about 6 grams in a 30 gram serving of the high protein flakes.

In one embodiment, the high protein flakes of the present invention have a moisture content of about 5% to about 15% by weight of the high protein flake, include at least one grain with the total amount of grain in an amount of about 42% to about 63% by weight of the high protein flake, and provide a protein content of about 4 grams to about 6 grams in a 30 gram serving of the high protein flakes.

In another embodiment, the high protein flakes of the present invention have a moisture content of about 5% to about 15% by weight of the high protein flake, include at least one grain with the total amount of grain in an amount of about 42% to about 63% by weight of the high protein flake, and provide a protein content of about 5 grams in a 30 gram serving of the high protein flakes.

In still another embodiment, the high protein flakes of the present invention have a moisture content of about 5% to about 15% by weight of the high protein flake, include at least one grain with the total amount of grain in an amount of about 42% to about 63% by weight of the high protein flake, and provide a protein content of at least about 5 grams in a 30 gram serving of the high protein flakes.

In one embodiment, the high protein flakes of the present invention have a protein content in an amount of about 6% to about 50% by weight of the high protein flakes, include at least one grain with the total amount of grain in an amount of about 10% to about 40% by weight of the high protein flakes, and have a moisture content of about 0.5% to about 4% by weight of the high protein flakes.

In another embodiment, the high protein flakes of the present invention have a protein content in an amount of about 8% to about 25% by weight of the high protein flakes, include at least one grain with the total amount of grain in an amount of about 10% to about 40% by weight of the high protein flakes, and have a moisture content of about 0.5% to about 4% by weight of the high protein flakes.

In still another embodiment, the high protein flakes of the present invention have a protein content in an amount of about 6% to about 50% by weight of the high protein flakes, include at least one grain with the total amount of grain in an amount of about 30% to about 40% by weight of the high protein flakes, and have a moisture content of about 0.5% to about 4% by weight of the high protein flakes.

In yet another embodiment, the high protein flakes of the present invention have a protein content in an amount of about 6% to about 50% by weight of the high protein flakes, include at least one grain with the total amount of grain in an amount of about 10% to about 40% by weight of the high protein flakes, and have a moisture content of about 1% to about 3% by weight of the high protein flakes.

In another embodiment, the high protein flakes of the present invention have a protein content in an amount of about 8% to about 25% by weight of the high protein flakes, include at least one grain with the total amount of grain in an amount of about 30% to about 40% by weight of the high protein flakes, and have a moisture content of about 1% to about 3% by weight of the high protein flakes.

In still another embodiment, the high protein flakes of the present invention have a protein content in an amount of about 8% to about 25% by weight of the high protein flakes, include at least one grain with the total amount of grain in an amount of about 10% to about 40% by weight of the high protein flakes, and have a moisture content of about 1% to about 3% by weight of the high protein flakes.

Carbohydrate or sugar sources used for the current invention may constitute about 1% to about 90%, about 1% to about 80%, about 1% to about 75%, about 1% to about 50%, about 1% to about 25%, about 5% to about 20%, or about 8% to about 18% by weight of the cooked food product or food component. Suitable carbohydrates include, but are not limited to, wheat flour, flour, dextrin, maltodextrin, carboxymethylcellulose (CMC), methylcellulose, hydroxypropylmethylcellulose (HPMC), guar gum, locust bean gum, xanthan gum, carrageenan, algins, levan, elsinan, pullulan, pectins, chitosan, and gum arabic; native starches such as corn starch, waxy maize starch, high-amylose corn starch, potato, tapioca, rice and wheat starch, modified starches such as those that have been acid modified, bleached, oxidized, esterified, etherified, and combinations thereof.

The starch used for the current invention is obtained from a source selected from the group of native leguminous starch, native cereal starch, native root starch, native tuber starch, native fruit starch, native algae starch, modified leguminous starch, modified cereal starch, modified root starch, modified tuber starch, modified fruit starch, modified algae starch, waxy type starches, high amylose starches or mixtures thereof. Typical sources for the starch are cereals, tubers, roots, legumes, fruit, algae, and hybrid starches. Suitable sources include but are not limited to wheat, corn, pea, potato, sweet potato, sorghum, banana, barley, rice, sago, amaranth, tapioca, arrowroot, cane and low amylose (containing no more than about 10% by weight amylose, preferably no more than 5%) or high amylose (containing at least about 40% by weight amylose) varieties thereof.

Sweetening agents used for the current invention may include sugar sweeteners and/or sugarless sweeteners, including high intensity artificial sweeteners. The sugar sweeteners generally include saccharide-containing components including, but not limited to, sucrose, dextrose, maltose, dextrin, invert sugar, fructose, levulose, galactose, corn syrup solids, vanilla syrup, and the like, alone or in any combination. Sugarless sweeteners include, but are not limited to sugar alcohols, such as sorbitol, mannitol, xylitol, isomalt, hydrogenated starch hydrolysates, maltitol, and the like, alone or in any combination. The high intensity artificial sweeteners include, but are not limited to, sucralose, aspartame, N-substituted APM derivatives such as neotame, salts of acesulfame, alitame, saccharin and its salts, cyclamic acid and its salts, glycyrrhizin, dihydrochalones, thaumatin, monellin, and the like, alone or in any combination. Combinations of sugar and/or sugarless sweeteners may be used in the cooked food product in any suitable amount. In one embodiment, the sweetening agent constitutes about 1% to about 20%, or about 2% to about 15% by weight of the cooked food product.

Colorants or coloring agents used for the current invention can be used in any suitable amount to produce a desired color. Further, the cooked food products of the present invention may have multi-colored patterns and/or other related designs or shapes to produce color contrasts. Coloring agents can include, for example, natural food colors and dyes suitable for food, drug, and cosmetic applications. The colorants are typically known as FD&C dyes and lakes such as FD&C Blue No. 1, FD&C Blue No. 2, FD&C Green No. 3, FD&C Yellow No. 5, FD&C Yellow No. 6, FD&C Red No. 3, FD&C Red No. 33, FD&C Red No. 40, and combinations thereof. The coloring agents may constitute about 0.01% to about 2% by weight of the cooked food product.

Preservatives used for the current invention may be employed to ensure the safety and quality of the cooked food product. Suitable preservatives include, but are not limited to, sorbic acid, sodium benzoate, potassium sorbate, methyl p-hydroxybenzoate, sodium propionate, and propyl p-hydroxybenzoate alone or in any combination. In addition, suitable antioxidants can also be utilized. Preservatives or the antioxidants may be present in an amount of about 0.01% to about 1% by weight of the cooked food product.

Nutritional or supplemental additives used for the current invention include ingredients such as vitamins, antioxidants, minerals, trace elements, fibers, and mixtures thereof. The vitamins may include vitamin A, B1 (thiamin), B2 (riboflavin), B6, B12, C, D, E and/or derivative thereof, niacin, folic acid, biotin, and pantothenic acid in a nutritionally acceptable form and amount. Examples of mineral and trace elements include calcium, iron, phosphorous, iodine, magnesium, manganese, zinc, copper, sodium, choline, potassium, selenium, and chromium in a nutritionally acceptable form and amount. Suitable antioxidants include alpha-tocopherol, citric acid, butylated hydroxytoluene, butylated hydroxyanisole, ascorbic acid, fumaric acid, malic acid, sodium ascorbate, and ascorbic acid palmitate in a nutritionally acceptable form and amount.

Examples

The following Examples are illustrative of the present invention but are not meant to be limiting thereof.

In accordance with some embodiments, a high protein flake comprises the following:

| Component | Broadest range of percent by weight based on total weight | Narrower range of percent by weight based on total weight |
| --- | --- | --- |
| Protein flour | 6-50 | 8-25 |
| Grains | 10-40 | 30-40 |
| Water | 0.5-4.0 | 1-3 |
| Sugars/sweeteners | 10-40 | 20-35 |
| Oils | 0-10 | 0-2 |
| Hydrocolloid gums | 0.0-1.0 | 0.00-0.06 |
| Salts | 0-2 | 0-1 |
| Emulsifiers | 0-1 | 0.00-0.6 |
| Optional flavor ingredients | 0-4 | 0.5-2 |

The present invention further comprises the aspects defined in the following clauses (which form part of the present description but are not considered as claims):

Clause 1. A method for preparing high protein flakes comprising:
forming a protein into a protein pellet; introducing the protein pellet and a food component into a cooker; cooking the protein pellet and the food component to give a cooked food product; and
forming the cooked food product into a high protein flake.

Clause 2. The method of clause 1, wherein the protein comprises a vegetable protein.

Clause 3. The method of clause 2, wherein the vegetable protein is derived from a cereal grain selected from the group consisting of wheat, corn, barley, oats, legumes, soybeans, and peas.

Clause 4. The method of clause 1, wherein the protein comprises wheat gluten, corn zein, defatted soy meal or flour, soy protein isolate, or mixtures thereof.

Clause 5. The method of clause 1, wherein the protein is substantially free of wheat gluten.

Clause 6. The method of clause 1, wherein the protein is substantially free of soy protein.

Clause 7. The method of clause 1, wherein the protein is substantially free of corn zein.

Clause 8. The method of clause 1, wherein the protein pellet has a protein content of at least about 30% by weight of the protein pellet.

Clause 9. The method of clause 1, wherein the protein pellet has a moisture content of less than about 40% by weight of the protein pellet.

Clause 10. The method of clause 1, wherein the method for forming the protein into the protein pellet comprises: providing the protein; introducing the protein to an extruder to form a protein extrudate; forcing the protein extrudate to exit the extruder; transferring the protein extrudate to a cold form extruder; forcing the protein extrudate to exit the cold form extruder; and cutting the protein extrudate to form the protein pellet.

Clause 11. The method of clause 10, further comprising the step of drying the protein pellet.

Clause 12. The method of clause 10, wherein the protein pellet has a diameter of between about 1.0 mm to about 10 mm.

Clause 13. The method of clause 1, wherein the cooker is a rotary cooker.

Clause 14. The method of clause 1, wherein the step of forming the cooked food product into a high protein flake comprises: pelletizing the cooked food product to provide a cooked food pellet; flaking the cooked food pellet to provide a flaked food product; and toasting the flaked food product to obtain the high protein flake.

Clause 15. The method of clause 1, wherein the food component comprises at least one of a grain, a sugar, or a starch.

Clause 16. The method of clause 15, wherein the grain is selected from the group consisting of oats, wheat, sorghum, rice, corn, barley, and mixtures thereof.

Clause 17. The method of clause 1, wherein an amount of the protein in the high protein flake is about 1% to about 50% by weight of the high protein flake.

Clause 18. The method of clause 1, wherein the high protein flake comprises one or more grains in an amount of about 30% to about 70% by weight of the high protein flake.

Clause 19. The method of clause 18, wherein the one or more grains is selected from the group consisting of oats, wheat, sorghum, rice, corn, barley, and mixtures thereof.

Clause 20. The method of clause 1, wherein a moisture content of the high protein flake is about 1% to about 5% by weight of the high protein flake.

Clause 21. A method for preparing high protein flakes comprising: introducing a protein pellet and a grain into a rotary cooker; cooking the protein pellet and the grain in the rotary cooker to obtain a food product; pelletizing the food product; and thermally processing the pelletized food product to obtain a high protein flake; wherein the high protein flake has a moisture content of about 1% to about 5% by weight, a characteristic hardness of about 8000 grams of force to about 13000 grams of force when measured using a Texture Testing Protocol, and a characteristic crunchiness of about 8000 grams per second to about 12000 grams per second when measured using the Texture Testing Protocol.

Clause 22. The method of clause 21, wherein the protein pellet is prepared from a protein flour derived from a cereal grain selected from the group consisting of wheat, corn, barley, oats, legumes, sorghum, soybeans, and peas.

Clause 23. The method of clause 21, wherein the protein pellet has a protein content of at least about 30% by weight of the protein pellet.

Clause 24. The method of clause 21, wherein the grain is selected from the group consisting of wheat, corn, barley, oats, legumes, sorghum, soybeans, peas, and combinations thereof.

Clause 25. The method of clause 21, further comprising introducing one or more food ingredients into the rotary cooker before the step of cooking.

Clause 26. The method of clause 25, wherein the one or more food ingredients comprises at least one of a grain, a starch, or a sugar.

Clause 27. The method of clause 21, wherein the step of thermally processing comprises: flaking the pelletized food product to give a flaked food product; and toasting the flaked food product to obtain the high protein flake.

Clause 28. The method of clause 21, wherein the high protein flake comprises protein in an amount of about 5% to about 50% by weight of the high protein flake.

Clause 29. The method of clause 21, wherein the step of cooking is conducted at a temperature of about 200° F. and at a pressure of about 2 psig to about 30 psig.

Clause 30. A method for producing high protein flakes comprising: preparing a protein pellet from a protein flour; heating the protein pellet and at least one food component in a rotary cooker to form a cooked food product; and forming a high protein flake; wherein the high protein flake exhibits less cereal flake breakage than a comparable high protein flake prepared without the protein pellet.

Clause 31. The method of clause 30, wherein the protein pellet has a moisture content of less than about 40% by weight of the protein pellet.

Clause 32. The method of clause 30, wherein the protein pellet has a diameter of about 1.0 mm to about 10 mm.

Clause 33. The method of clause 30, wherein the protein pellet has a density of about 0.3 g/cm3 to about 0.9 g/cm3.

Clause 34. The method of clause 30, wherein the protein pellet has a protein content of at least about 30% by weight of the protein pellet.

Clause 35. The method of clause 30, wherein the at least one food component comprises a grain, a sugar, or a starch.

Clause 36. The method of clause 30, wherein the protein flour is derived from a cereal grain selected from the group consisting of wheat, corn, sorghum, barley, oats, legumes, soybeans, and peas.

Clause 37. The method of clause 30, wherein the high protein flake comprises protein in an amount of about 1% to about 50% by weight of the high protein flake.

Clause 38. The method of clause 30, wherein the high protein flake and the comparable high protein flake both comprise substantially a same amount and a same type of protein.

Clause 39. The method of clause 30, wherein the step of preparing the protein pellet comprises extruding the protein flour and cold forming the protein pellet.

Clause 40. A method for preparing high protein flakes comprising: combining a quantity of protein pellets and food ingredients in a rotary cooker to form an uncooked food product; thermally processing the uncooked food product to produce a cooked food product; and processing the cooked food product to obtain a high protein flake; wherein the quantity of the protein pellets is sufficient to provide a total protein content in the high protein flake of about 1% to about 50% by weight of the high protein flake.

Clause 41. The method of clause 40, further comprising preparing the protein pellet from a protein flour before the step of cooking.

Clause 42. The method of clause 40, wherein the quantity of protein pellets in the uncooked food product is an amount of about 10% to about 70% by weight of the uncooked food product.

Clause 43. The method of clause 40, wherein the food ingredients comprise one or more of a grain, a sugar, or a starch.

Clause 44. The method of clause 40, wherein the step of thermally processing is at a temperature of about 150° F. to about 400° F.

Clause 45. The method of clause 40, wherein the step of thermally processing is at a pressure of about 2 psig to about 35 psig.

Clause 46. A method for preparing a plurality of high protein flakes comprising: introducing a protein pellet and a grain into a rotary cooker; cooking the protein pellet and the grain in the rotary cooker to obtain a cooked food product; pelletizing the cooked food product; and thermally processing the pelletized food product to obtain the plurality of high protein flakes.

Clause 47. The method of clause 46, wherein each high protein flake in the plurality of high protein flakes has a substantially uniform distribution of protein within the high protein flake.

Clause 48. The method of clause 46, wherein a first high protein flake and a second high protein flake in the plurality of high protein flakes have substantially equal amounts of protein.

Clause 49. The method of clause 46, wherein the protein pellet has a density of at least about 0.3 g/cm3.

Clause 50. The method of clause 46, wherein the plurality of high protein flakes provides a protein content of at least about 5 grams in a 30 gram serving of the plurality high protein flakes.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of preparing a flaked cereal product comprising:
providing a first mixture having a protein content of at least 80% by weight;
preconditioning the first mixture to form a dough;
providing the dough to an extruder to form a protein extrudate;
forming a plurality of first pellets from the protein extrudate;
providing the first pellets, at least one grain, a sugar, water, and a starch to a cooker to form a second mixture, wherein the first pellets are provided in an amount of 15% to 30% by weight of the second mixture:
cooking the second mixture;
forming the second mixture into a plurality of second pellets; and
forming the plurality of second pellets into a plurality of flakes.

2. The method of claim 1, wherein the first mixture includes a vegetable protein and water.

3. The method of claim 1, further comprising preconditioning the first mixture to form the first mixture into a first dough.

4. The method of claim 1, wherein upon providing the dough to the extruder a moisture level of about 30% to 60% by weight is obtained.

5. The method of claim 1, wherein the plurality of first pellets are cylindrically shaped and have a diameter of at least 1 mm and a length of at least 0.5 mm.

6. The method of claim 1, wherein the plurality of the first pellets have a moisture content of less than or equal to 20% by weight.

7. The method of claim 1, wherein the plurality of first pellets have a density from about 0.02 g/cm$^3$ to about 0.1 g/cm$^3$.

8. The method of claim 1, wherein the cooker is a rotary cooker and the second mixture is cooked for a cycle time of about 30 minutes to 90 minutes, at a cooking temperature of 250° F. to 280° F., and at a pressure of 15 psig to 25 psig to a moisture content of 30% to 50% by weight.

9. The method of claim 1, wherein the plurality of first pellets have a hardness of at least 1000 grams.

10. A method of preparing a flaked cereal product comprising:
forming a plurality of first pellets from a first mixture, each of the pellets having a protein content of at least 80% by weight, and a diameter of at least 1 mm;
providing the plurality of first pellets and at least one of a grain, a sugar, or a starch to a cooker to form a second mixture, wherein the first pellets are provided in an amount of 15% to 30% by weight of the second mixture;

cooking the second mixture;

forming the second mixture into a plurality of second pellets; and forming the plurality of second pellets into a plurality of flakes.

11. The method of claim 10, wherein the first mixture includes a vegetable protein and water.

12. The method of claim 10, further comprising preconditioning the first mixture to form the first mixture into a dough prior to forming the plurality of first pellets.

13. The method of claim 12, further comprising providing the dough to an extruder prior to forming the plurality of first pellets, wherein a moisture level of about 30% to 60% by weight is obtained.

14. The method of claim 10, wherein the plurality of first pellets are cylindrically shaped and have a diameter of at least 1 mm and a length of at least 0.5 mm.

15. The method of claim 10, wherein the plurality of the first pellets has a moisture content of less than or equal to 20% by weight.

16. The method of claim 10, wherein the plurality of first pellets have a density from about 0.02 $g/cm^3$ to about 0.1 $g/cm^3$.

17. The method of claim 10, wherein the cooker is a rotary cooker and the second mixture is cooked for a cycle time of about 30 minutes to 90 minutes, at a cooking temperature of 250° F. to 280° F., and at a pressure of 15 psig to 25 psig to a moisture content of 30% to 50% by weight.

18. The method of claim 10, wherein the plurality of first pellets have a hardness of at least 1000 grams.

* * * * *